United States Patent Office

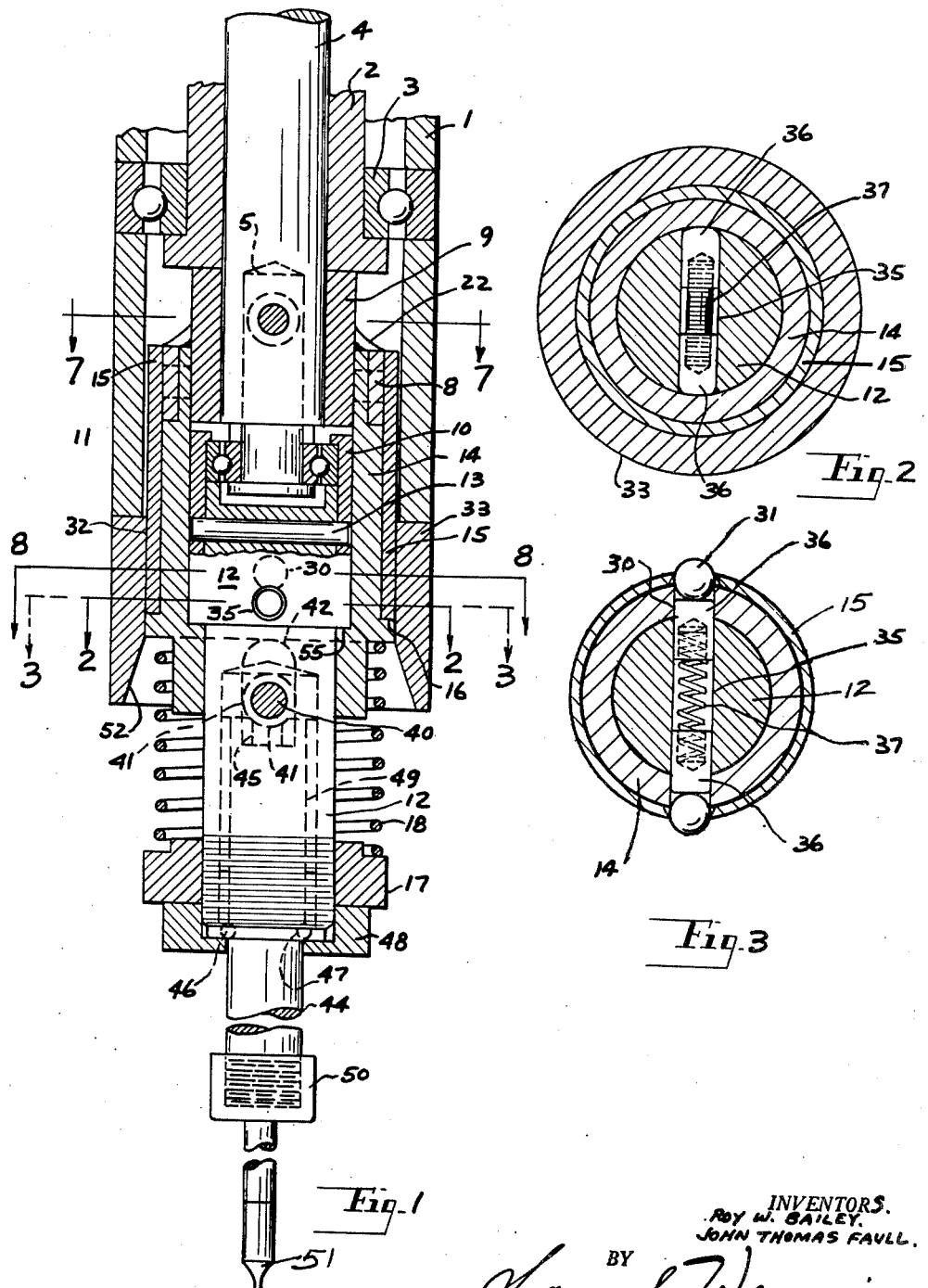

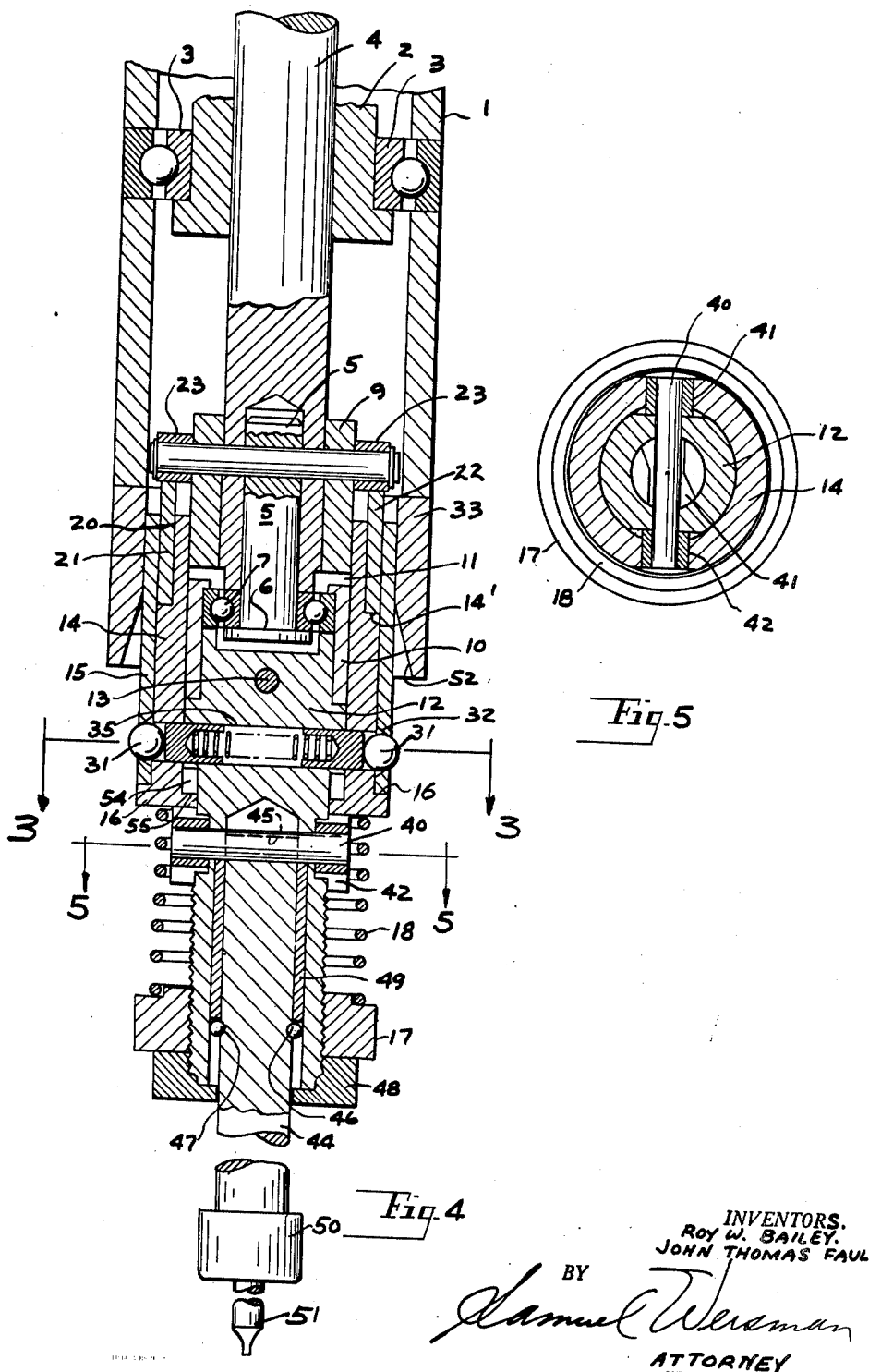

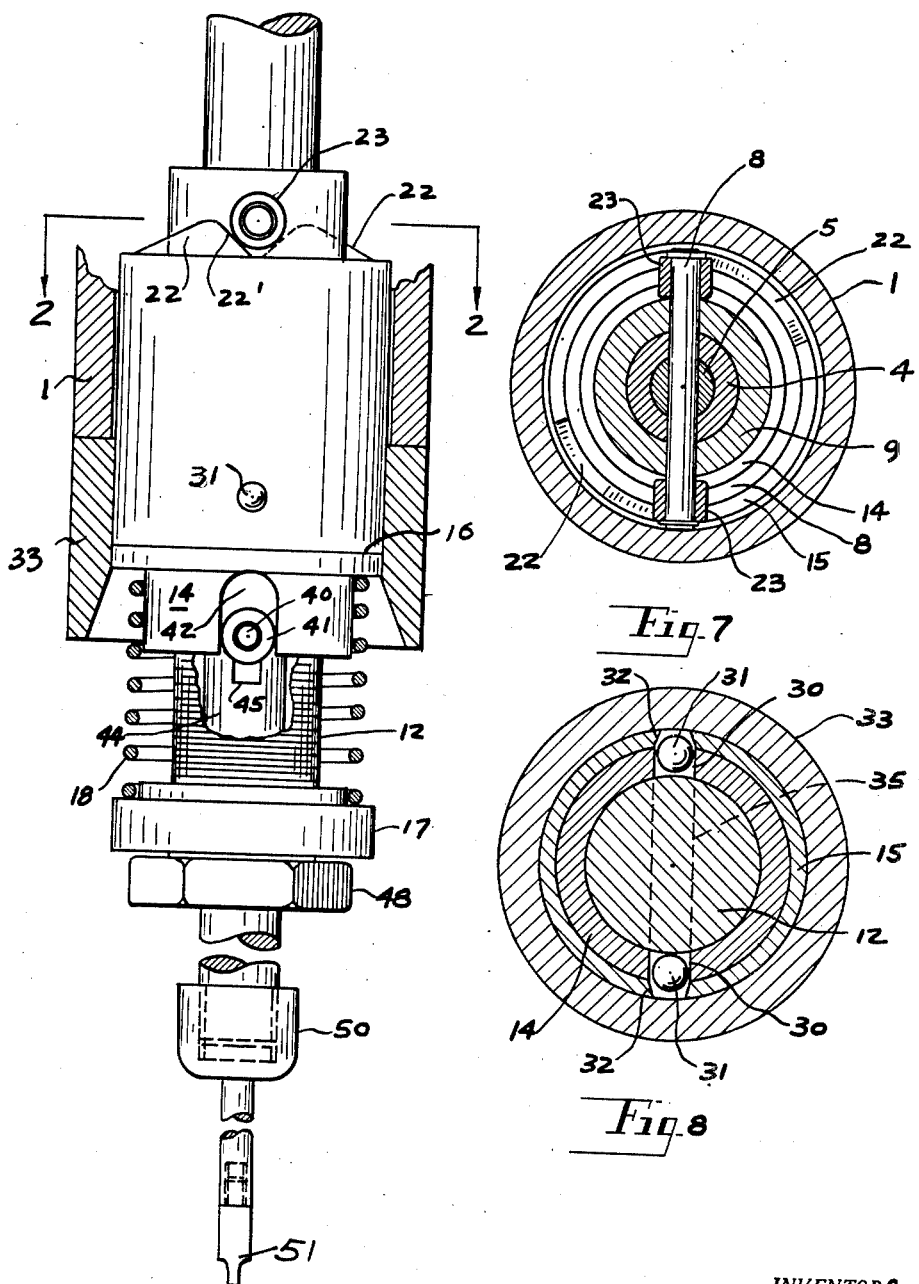

2,707,039
Patented Apr. 26, 1955

2,707,039

OVERLOAD RELEASE CLUTCH

Roy W. Bailey and John T. Faull, Detroit, Mich., assignors to Detroit Power Screwdriver Company, Detroit, Mich., a corporation of Michigan Application August 17, 1954, Serial No. 450,495

8 Claims. (Cl. 192—56)

The present invention pertains to a novel torque clutch controlling a rotating driving spindle applied to threaded members such as screws, bolts and nuts. The invention is herein described illustratively with reference to the driving of a screw.

Various types of torque clutches are known, and each has been found objectionable in its own way. For example, friction clutches are affected by temperature changes, lubricants, and do not provide for uniform adjustment from minimum to maximum torque. In the impact type of torque clutch, the impact produces severe wear on the parts, the torque is dependent on the downward pressure on the spindle, and the torque is affected by the length of time that the spindle is held down at the completion of the drive.

A principal object of the invention is to provide a clutch that overcomes these objections. A further object is to provide a relatively simple and rugged construction for the purpose set forth, depending for its locking-out action on the pressure of a spring rather than on slip or impact.

In the accomplishment of these objects, the drive spindle has a cross pin or similar device abutting against a cam structure on a clutch body which in turn is connected to a clutch spindle. The drive is effected by abutment against the cam structure and not by cam action. The lower spindle, which carries the driver, is slidably suspended from the clutch spindle, and a suitable driving connection between these parts is provided.

The locking out action is initiated by the stoppage of rotation of the lower spindle and the connected clutch body with its cam structure when the work piece is driven tight. The driving spindle continues to rotate, and its drive piece now rides on and depresses the non-rotating cam structure and clutch body against the spring that supports the clutch body. In this depressed position, the clutch body becomes locked radially to the clutch spindle, whereby the cam structure is held out of its locking relation with the drive spindle.

A further object of the invention is to provide means for automatically releasing this lock when the assembly is again raised from the work surface for another operation. A portion of the locking mechanism in the locked position is exposed outward of the clutch assembly. On being elevated, the projected portion engages a fixed flared member by which it is repelled to the release position, whereupon the supporting spring restores the original relation of parts.

The pressure required to depress the cam structure to the non-drive relation is determined by adjustment of the supporting spring. The cam action against spring pressure commences only when the work piece has stopped turning, and thus the tightness of the work piece is related to the adjusted pressure of the spring.

The invention is fully disclosed by way of example in the following description and in the accompanying drawings in which Figure 1 is a vertical section of the device in the idle position before driving;

Figures 2 and 3 are sections on the lines 2—2 and 3—3 of Figure 1, Figure 3 showing the clutch disengaged or locked out and being also a section on the line 3—3 of Figure 4;

Figure 4 is a vertical section of the device in the locked out position after driving;

Figure 5 is a section on the line 5—5 of Figure 5;

Figure 6 is a side elevation, partly in section, corresponding to Figure 1, and Figures 7 and 8 are sections on the lines 7—7 and 8—8 of Figure 1.

Reference to these views will now be made by use of like characters which are employed to designate corresponding parts throughout.

In Figure 1 is shown a fixed cylindrical housing 1 in which the device is assembled as will be described. A sleeve bearing 2 is mounted concentrically in the housing 1 and is adapted to rotate therein through a ball bearing 3 between it and the housing. The member 2 however does not slide. An upper spindle 4 passes downwardly through the member 2 and is slidable therein. Suitable means are provided for driving the spindle 4.

Into the lower end of the spindle 4 is inserted a vertical pin 5 having at its lower end a head 6 spaced from the lower extremity of the spindle 4 by a radial ball bearing 5 engaging a surrounding part as will be described. The pin 5 is held in the spindle 4 by a cross pin 8 which also passes through a surrounding bushing 9.

From the bearing 7 is suspended a retaining sleeve 10 having its upper end spaced at 11 from the lower end of the bushing 9 for play in the movement of the parts. A clutch spindle 12 is inserted upwardly in the sleeve 10 and is suspended therefrom by a cross pin 13. A clutch body 14 is slidably mounted around the clutch spindle 12 and sleeve 10 and is in turn held in a sleeve retainer 15 which rests on the shoulder 16 near the lower end of the member 14. The lower end of the clutch spindle 12 carries an adjustable nut 17 on which is mounted a coil spring 18 that supports the vertically slidable clutch body 14 and retainer 15.

The upper end of the clutch body 14 is reduced in outside diameter at 20 to receive a cam sleeve 21 resting on the shoulder 14' thus formed. On the upper end of the sleeve 21 are formed or provided a pair of cam elements 22 spaced 180° apart. The pin 8 is projected over these elements and carries rollers 23 riding thereon.

As shown in Figure 8 the clutch body 14 is formed with diametrically opposed holes 30 receiving each a ball 31. The sleeve retainer 15 is formed with diametrically opposed holes 32 adapted to aline with the holes 30 to receive the balls and reduced at their outer ends to retain the balls, when this portion is pushed downward as will presently be described. Prior to this movement the balls are retained by the fixed reset sleeve 33 positioned directly below the housing 1, in the non-driving position as shown in Figure 1.

The clutch spindle 12 is formed with a diametrical hole 35 which lies at a lower level than the holes 30, 32 in the non-driving position. The hole 35 contains a pair of slidable pins 36 pushed outwardly by a spring 37 and engaging the surrounding clutch body 14 in the non-driving position. In the subsequent driving position the parts 14, 15 are moved downward on the clutch spindle 12 to bring the balls 31 into engagement with the pins 36 whereby the balls are projected slightly outward from the sleeve retainer for a purpose to be described.

Through the lower end of the clutch spindle 12 is passed a pin 40 (Figure 5) carrying a roller 41 at each end outside the spindle. The rollers are received in notches 42 in the clutch body 14, and the notches have an additional height for relative downward movement on the body 14. On such movement the pin 40 engages the lower spindle 44 inserted in the clutch spindle 12, by entering a slot 45 cut across the upper end of the lower spindle.

The lower spindle 44 is retained in the clutch spindle 12 by a series of balls 46 received in the groove of 47 in the spindle and confined in a retaining nut 48 screwed on the spindle 12 below the nut 17. A bushing 49 is fitted in the spindle 12 around the upper end of the inserted spindle 44 and at some distance above the groove 47. A screwdriver 50 is fitted on the lower end of the lower spindle 44 to engage a screw head 51 below.

In the operation of the device, in the non-driving position, the upper driving spindle 4 drives the clutch body 14 by engagement of the rollers 23 against the steep ends 22' of the cams 22 as shown in Figure 6. Also the clutch body 14 drives the clutch spindle 12 through rollers 41 and pin 40 since the rollers are engaged in the notches 42. However, there is no drive from the clutch spindle 12 to the lower spindle 44 until the pin 40 enters the slot 45.

The driving spindle 4 is next moved downwardly, while rotating, by any known or suitable means for this purpose, carrying with it the sleeve 15 and parts assembled therein. When this movement meets resistance by engagement of the driver 50 with screwhead 51, further downward movement of the assembly compresses the spring 18 and brings the pin 41 into the slot 45 to rotate the lower spindle 44. The relative downward movement of the clutch body 14 on the rollers 41 at this time is permitted by the upward play in the notches 42. The same relative movement has brought the hole 35 of clutch spindle 12 in a position to register with holes 30 of clutch body 14, but the pins 36 cannot enter holes 30 since the balls 31 are still retained or obstructed by the sleeve 15. This is a position intermediate Figures 1 and 4.

When the screw 50 has been driven tight, the lower spindle 44 will stop rotating. At a resistance determined by the pressure of spring 18, the rollers 23 will ride up on the cams 22 to depress the clutch body 14 until the balls 31 register with and are projected into the holes 32 of sleeve 15. The clutch body 14 is thereby locked in a position that holds the cams 22 entirely below the rollers 23 so that the latter no longer drive the clutch body and the lower spindle 44. Thus, on obtaining the desired tightness of screw 51 as determined by the pressure of spring 18, there is no further tightening of the screw.

The downward displacement of the clutch body 14 is shown by the gap 54 in Figure 4 over the inward shoulder 55 of the clutch body which formerly engaged the head of the clutch spindle 12.

The drive spindle 44 is now elevated, and the projected balls 31 and pins 36 are pushed inward or reset by engagement of the balls with a downwardly flared recess 52 in the lower end of the reset sleeve 33. The assembly is now restored to the non-driving position shown in Figure 1 and is ready for another operation as described.

Although a specific embodiment of the invention has been illustrated and described, it will be understood that various alterations in the details of construction will be made without departing from the scope of the invention as indicated by the appended claims.

What we claim is:

1. A torque clutch comprising a rotatable and vertically slidable drive spindle, a clutch spindle freely suspended therefrom, a clutch body slidably mounted on said clutch spindle, driving means joining said clutch body to said clutch spindle, a driven spindle slidably suspended from said clutch spindle, clutch means between said driven spindle and said clutch body and adapted to engage on sliding movement of said clutch body, a cam on the upper end of said clutch body, a driving member on said drive spindle and adapted to engage said cam radially to rotate said body, a spring retained on said clutch spindle and bearing upwardly on the lower end of said clutch body, a radial locking device in said clutch spindle and normally held idle therein, means at a higher level in said clutch body for interlocking with said device on relative downward movement of said body, said driving member being adapted to ride up on said cam and thereby depress said body to aline said interlocking means with said locking device on arrested rotation of said lower spindle, clutch spindle and clutch body.

2. A torque clutch as set forth in claim 1, further comprising retaining means at the outer wall of said body adapted to receive and retain projected portions of said locking device, a fixed reset sleeve surrounding said retaining means, the lower end of said reset sleeve having a flared inner surface engageable by said projected portion, whereby to repel said locking device radially inward on elevation of the first sleeve in the reset sleeve.

3. A torque clutch as set forth in claim 1, further comprising a retaining sleeve surrounding said body and slidable therewith, said sleeve having an aperture adapted to receive and retain a projected portion of said locking device, a fixed reset sleeve surrounding said retaining means, the lower end of said reset sleeve having a flared inner surface engageable by said projected portion, whereby to repel said locking device radially inward on elevation of the first sleeve in the reset sleeve.

4. A torque clutch as set forth in claim 1, further comprising a nut threaded on said body and constituting the retaining means for said spring, the tension of said spring being adjustable by said nut.

5. A torque clutch comprising a rotatable and vertically slidable drive spindle, a clutch spindle freely suspended therefrom, a clutch body slidably mounted on said clutch spindle, said clutch spindle having a vertically elongated slot, a drive pin passing through said body and into said slot, a driven spindle slidably suspended from said clutch spindle, the upper end of said driven spindle having a notch directly below said slot and adapted to receive said drive pin on relative upward movement of said driven spindle, a cam on the upper end of said clutch body, a driving member on said drive spindle and adapted to engage said cam radially to rotate said body, a spring retained on said clutch spindle and bearing upwardly on the lower end of said clutch body, a radial locking device in said clutch spindle and normally held idle therein, means at a higher level in said clutch body for interlocking with said device on relative downward movement of said body, said driving member being adapted to ride up on said cam and thereby depress said body to aline said interlocking means with said locking device on arrested rotation of said lower spindle, clutch spindle and clutch body.

6. A torque clutch comprising a rotatable and vertically slidable drive spindle, a clutch spindle freely suspended therefrom, a clutch body slidably mounted on said clutch spindle, driving means joining said clutch body to said clutch spindle, a driven spindle slidably suspended from said clutch spindle, clutch means between said driven spindle and said clutch body and adapted to engage on sliding movement of said clutch body, a cam on the upper end of said clutch body, a driving member on said drive spindle and adapted to engage said cam radially to rotate said body, a spring retained on said clutch spindle and bearing upwardly on the lower end of said clutch body, a radial spring-backed pin in said clutch spindle and normally held idle therein, said clutch body having an aperture at a higher level to receive said pin on relative downward movement of said body, said driving member being adapted to slide up on said cam and thereby depress said clutch body and to aline said aperture with said pin on arrested rotation of said lower spindle, clutch spindle and clutch body.

7. A torque clutch as set forth in claim 6, further comprising a rounded member freely movable in said aperture and engageable by said pin, a retaining sleeve surrounding said body and slidable therewith, said sleeve having an aperture to receive and retain said rounded member in a projected position out of the second aperture, a fixed reset sleeve surrounding said retaining means, the lower end of said reset sleeve having a flared inner surface engageable by said projected portion, whereby to repel said rounded member and pin radially inward on elevation of the first sleeve in the reset sleeve.

8. A torque clutch as set forth in claim 5, further comprising a nut threaded on said body and constituting the retaining means for said spring, the tension of said spring being adjustable by said nut.

References Cited in the file of this patent

UNITED STATES PATENTS

| | | |
|---|---|---|
| 998,615 | Huneke | July 25, 1911 |
| 1,725,562 | Borchert | Aug. 20, 1929 |
| 2,263,709 | Van Sittert | Nov. 25, 1941 |